(12) United States Patent
Kawai et al.

(10) Patent No.: US 7,210,886 B2
(45) Date of Patent: May 1, 2007

(54) FASTENER FOR CURTAIN AIRBAG

(75) Inventors: Yasuhiro Kawai, Toyohashi (JP); Yoshiharu Kawasaki, Tokyo (JP); Shuichi Okinaka, Chiyoda-machi (JP); Mitsuo Nogami, Chiyoda-machi (JP)

(73) Assignee: Newfrey LLC, Newark, DE (US)

( * ) Notice: Subject to any disclaimer, the term of this patent is extended or adjusted under 35 U.S.C. 154(b) by 45 days.

(21) Appl. No.: 10/704,696

(22) Filed: Nov. 12, 2003

(65) Prior Publication Data
US 2004/0136812 A1 Jul. 15, 2004

(30) Foreign Application Priority Data
Nov. 19, 2002 (JP) ............... 2002-334748

(51) Int. Cl.
*F16B 19/00* (2006.01)
(52) U.S. Cl. ...................... 411/508; 411/182
(58) Field of Classification Search ........ 411/508–510, 411/913, 80.5, 80.6, 175, 182; 24/453, 297
See application file for complete search history.

(56) References Cited

U.S. PATENT DOCUMENTS

| | | | | |
|---|---|---|---|---|
| 3,701,302 A | * | 10/1972 | Pestka et al. ................. | 411/15 |
| 3,756,116 A | * | 9/1973 | Schuplin ....................... | 411/15 |
| 4,263,833 A | | 4/1981 | Loudin et al. ................ | 411/41 |
| 4,497,516 A | * | 2/1985 | Morita et al. ................ | 296/206 |
| 4,906,152 A | * | 3/1990 | Kurihara ..................... | 411/182 |
| 5,536,125 A | * | 7/1996 | Gaw, Jr. ...................... | 411/182 |
| 5,947,630 A | * | 9/1999 | Dillon ......................... | 403/393 |
| 6,553,615 B1 | * | 4/2003 | Hansen et al. ................ | 16/2.1 |
| 2001/0027588 A1 | * | 10/2001 | Mizuno et al. ................ | 16/2.2 |
| 2005/0286987 A1 | * | 12/2005 | Balbo Di Vinadio ....... | 411/80.5 |

FOREIGN PATENT DOCUMENTS

| | | |
|---|---|---|
| JP | 61-175309 | 8/1986 |
| JP | 62-77308 | 5/1987 |
| JP | 62-166309 | 10/1987 |
| JP | 1-216109 | 8/1989 |
| JP | 2002-104127 | 4/2002 |

\* cited by examiner

*Primary Examiner*—Robert J. Sandy
*Assistant Examiner*—Jeffrey A Sharp
(74) *Attorney, Agent, or Firm*—Miles & Stockbridge P.C.

(57) ABSTRACT

A fastener for fixing a curtain airbag to a body panel of an automobile comprises a screw grommet having a shank to be inserted into mounting holes of an airbag-anchor portion and a body panel, and a flange to press the airbag-anchor portion against the body panel. The flange has an opening and the shank has a shank hole continuous to the opening into which a tapping screw is driven. The shank has resilient fingers protruding outward from sides of the shank to engage edge regions of mounting holes in a temporary fixing state. The fingers are held in a permanent fixing state by screwing the tapping screw into the shank hole, preventing the fingers from being bent inward. The flange has an edge with an upstanding partition to allow a central region of the flange to be partitioned from a main body of the curtain airbag.

3 Claims, 6 Drawing Sheets

AIRBAG EXPANSION

FASTENER FOR CURTAIN AIRBAG

CROSS REFERENCE TO RELATED APPLICATION

This application claims the benefit of Japanese Application No. 2002-334748 filed Nov. 19, 2002, incorporated herein by reference.

BACKGROUND OF THE INVENTION

The present invention relates to a fastener for fixing an airbag-anchor portion of a curtain airbag to a body panel of an automobile or other vehicle.

Japanese Patent Laid-Open No. 2002-104127 discloses a structure for fixing a head-protecting curtain airbag to a body panel of an automobile. For fixing the curtain airbag, a fastener comprising a knob member, a shank and an engagement member is prepared, and an engagement hole for receiving the engagement member is formed in the body panel. After the engagement member and the shank of the fastener are inserted into the respective mounting holes of an airbag-anchor portion of the curtain airbag and the body panel, the knob member is rotated to fix the curtain airbag to the body panel. The fixing operation can be completed without using a tool. However, the fastening force of this fastener is not high, because the airbag-anchor portion is fixed to the body panel by clamping the body panel and the airbag-anchor portion between the engagement member and the knob member. Since an activated airbag is rapidly deployed and the fastener takes a strong reaction force therefrom, an insufficient fastening force is likely to result in undesirable damage to the fixing structure.

In another known fixing structure for a curtain airbag, a nut is welded to a body panel, and an airbag-anchor portion of the curtain airbag is fixed with a bolt threaded into the nut. While this structure provides a high fastening force, it requires welding the nut to the body panel, and such an additional operation is contrary to operational simplification in automobile assembling lines. Further, in the fixing operation, before the curtain airbag is permanently fixed, it is temporarily fixed to the body panel in order to locate the curtain airbag at a predetermined position, and a special structure is required for the temporary fixing operation.

Screw grommets disclosed in Japanese Utility Model Laid-Open Nos. 62-166309, 62-77308 and Japanese Patent Laid-Open No. 1-216109 are intended to connect first and second panels. Each screw grommet has a shank adapted to be inserted into a mounting hole of one of the panels, and a flange having a size larger than the mounting hole. The shank is formed with a hole for allowing a tapping screw to be driven thereinto through an opening in the flange. A screw grommet can be attached to the first panel by inserting the shank into the mounting hole of the first panel and clamping the first panel between an engagement portion of the shank and the flange. After the second panel is held at a position where the mounting hole of the second panel is aligned with the opening of the flange, the tapping screw is driven into the mounting hole of the second panel and the hole of the screw grommet. In these references there is no suggestion of applicability of their screw grommets to the fixing of a curtain airbag, and there is no mention of the need for coping with the reaction on the fastener caused by sudden expansion of an activated airbag.

BRIEF DESCRIPTION OF THE INVENTION

It is therefore an object of the present invention to provide a fastener for fixing a curtain airbag to a body panel of an automobile or other vehicle, that provides a high fastening force, and that achieves temporary and permanent fixing simply and easily.

In an embodiment of the present invention, a fastener for fixing an airbag-anchor portion of a curtain airbag to a body panel of a vehicle comprises a screw grommet having a shank adapted to be inserted into respective mounting holes of both the airbag-anchor portion and the body panel, and a flange adapted to be brought into surface contact with the airbag-anchor portion and to press the airbag-anchor portion against the body panel. The flange is formed with an opening and the shank is formed with a shank hole continuous to the opening which allow a tapping screw to be driven thereinto. The shank has resilient engagement fingers flexibly protruding outward from sides of the shank to engage with edge regions of a mounting hole for temporary fixing of the airbag-anchor portion of the curtain airbag to the body panel of the vehicle. The resilient engagement fingers are held in a permanent fixing state by screwing the tapping screw into the shank hole, to prevent the fingers from being bent inward. Further, the flange has an edge integrally formed with a partition plate which stands upright from the edge to partition the flange region having the opening from a main body of the curtain airbag.

The fastener may further include a protective plate attached onto and over the flange of the screw grommet to protect the flange and to enhance the pressing force of the tapping screw against the flange. The protective plate can provide enhanced strength to the flange to obtain enhanced fastening force to the body panel. Thus, the fixing of the curtain airbag can be reliably maintained even in occurrence of reaction caused by sudden expansion of the activated airbag.

The fastener may further include a support plate for clamping the airbag-anchor portion between the support plate and the flange. The support plate is formed with a mounting hole for the shank to pass therethrough, and allows pre-attaching screw grommets of fasteners to each of a plurality of mounting holes formed in the airbag-anchor portion at given positions. After transporting the curtain airbag assembled with the fasteners to an automobile production line or the like, the curtain airbag can be temporarily fixed to a body panel merely by inserting the shanks of the screw grommets into the body panel.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 1:
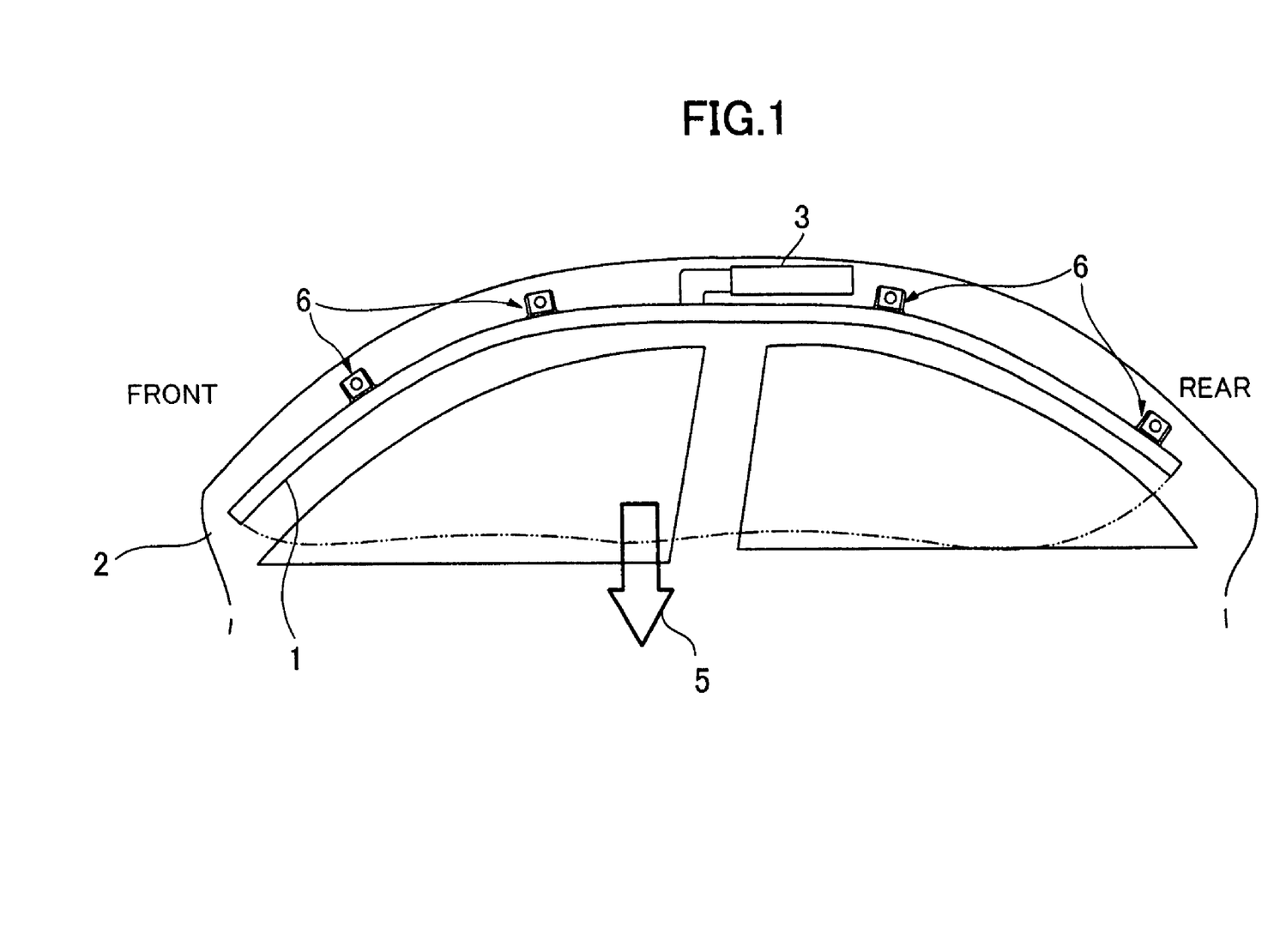
FIG. 1 is an explanatory view of a curtain airbag attached to a body panel of an automobile.

With reference to the drawings, one embodiment of the present invention will now be described. FIG. 1 schematically shows a curtain airbag 1 attached to an automobile 2. The curtain airbag 1 is intended to protect an occupant of the automobile, and is attached to an interior member of an automobile on the upper side of front and rear door windows. In an automobile collision, the airbag is activated to suddenly expand (rapidly deploy) downward (arrow 5) along the door windows in response to gas spouting from a compressed gas source 3, so-called inflator, so as to protect the head and body of the occupant. The curtain airbag 1 comprises a main body portion and an airbag-anchor portion. The airbag-anchor portion is fixed to a body panel of an automobile, such as a body frame, at a plurality of predetermined positions 6 on the upper side of door windows. The main airbag body is normally folded in a compact size and disposed at a fixed position above the door windows.

Figure 2:
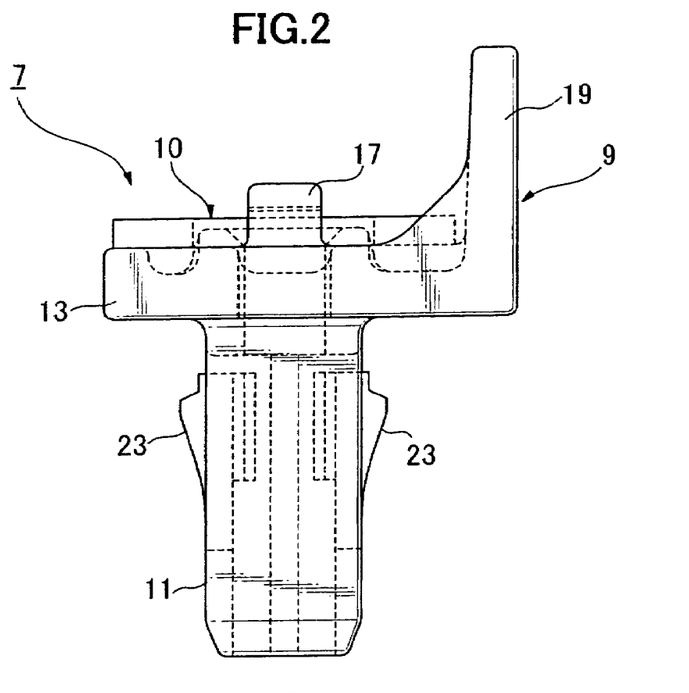
FIG. 2 is a front view of a fastener according to one embodiment of the present invention.
Figure 3:
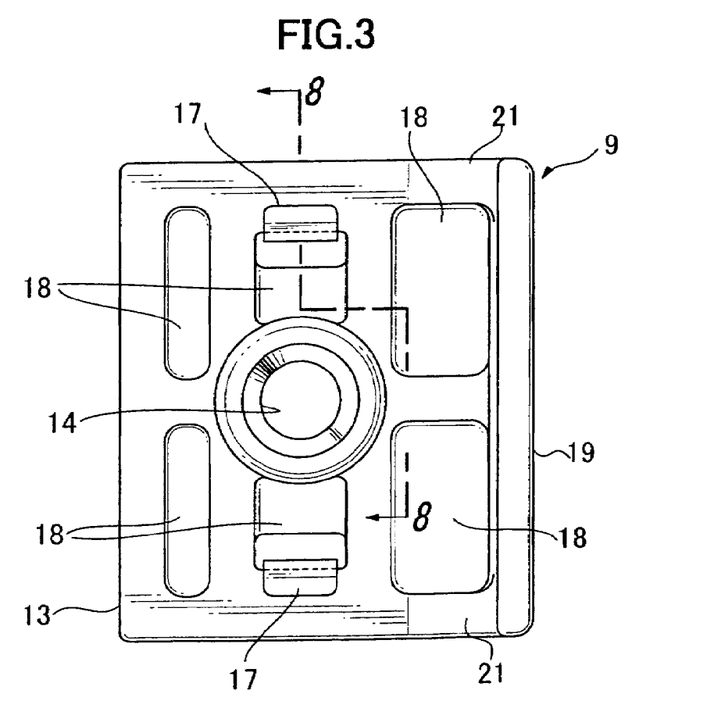
FIG. 3 is a top plan view of a screw grommet of the fastener in FIG. 2.
Figure 4:
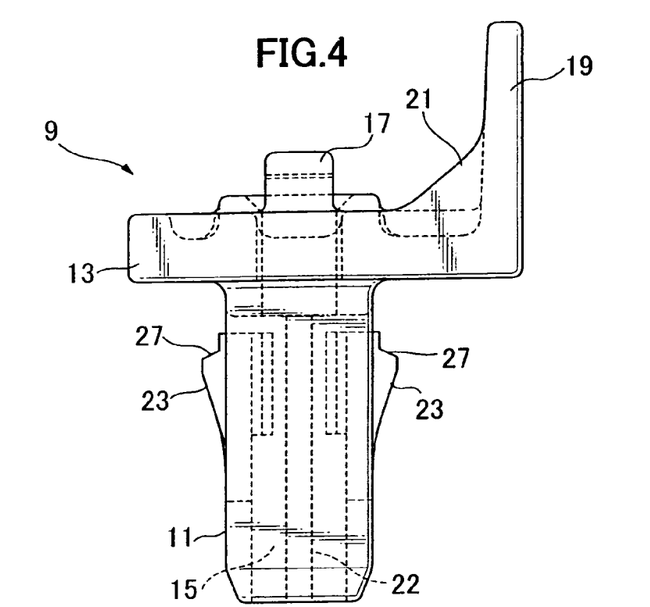
FIG. 4 is a front view of the screw grommet in FIG. 3.

FIG. 2 shows a fastener 7 for use in fixing the airbag-anchor portion of the curtain airbag 1 to the body panel at the plurality of predetermined positions 6, according to one embodiment of the present invention. The fastener 7 includes a screw grommet 9 and preferably includes a protective plate 10. When used, the protective plate protects a flange of the screw grommet and helps a tapping screw to provide an enhanced pressing force to the flange. Preferably, the fastener 7 further includes a support plate 33 (FIG. 9) for clamping the airbag-anchor portion between the support plate and the flange to maintain a temporary fixing state, as described in detail later. The screw grommet 9 is preferably an integrally molded or one-piece component of hard plastic material. The protective plate 10 in this embodiment is preferably made of metal, such as steel; however, it may be an integrally molded component of hard plastic material. As with the protective plate, the support plate 33 may be made of metal, such as steel; however, it may be an integrally molded component of hard plastic material.

With reference to FIGS. 3 to 8, the screw grommet 9 will be described in more detail. The screw grommet 9 includes a shank 11 adapted to be insert into respective mounting holes of both the airbag-anchor portion of the curtain airbag 1 and the body panel, and a flange 13 at one end (upper end in FIG. 4) of the shank 11 and adapted to be brought into surface contact with the airbag-anchor portion to press the airbag-anchor portion against the body panel. The flange 13 is formed with an opening 14 and the shank 11 is formed with a shank hole 15 continuous to the opening 14 which allow a tapping screw to be driven or screwed thereinto.

The flange 13 has a first surface (lower surface in FIG. 4) on the side adjacent to the shank 11 and formed in a flat plane so that the first surface can be entirely brought into contact with the airbag-anchor portion and pressed against the airbag-anchor portion. A second surface (upper surface in FIG. 4) of the flange 13 on the opposite side has the inlet of opening 14 (FIGS. 3 and 7) formed in a tapered shape to allow the tapping screw to be readily inserted. The second surface (upper surface in FIG. 4) of the flange 13 has a size and shape allowing the protective plate 10 to be placed thereon (FIG. 2). In the illustrated embodiment, the flange 13 is formed as an approximately rectangular rigid plate.

Figure 8:
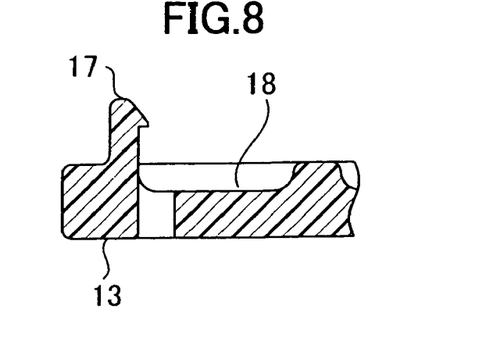
FIG. 8 is a fragmentary sectional view of the screw grommet taken along the line 8—8 in FIG. 3.

The second surface of the flange 13 is formed with a pair of resilient tapered lock pawls 17 adapted to be engaged with edges of the protective plate 10 placed thereon. The detailed configuration of a lock pawl 17 is shown in FIG. 8. To attach the protective plate 10 to the flange 13, it is superimposed over the second surface of the flange 13 and pressed toward the second surface of the flange to spread the lock pawls 7 and then engage them with edges of the protective plate. The flange 13 may also be formed with several concave portions 18 to save material and reduce weight while maintaining sufficient rigidity of the flange.

One edge of the rectangular flange 13 is integrally formed with a partition plate 19 standing upright from the edge in the opposite direction to the shank 11 to allow the central region of the flange 13 having the opening 14 to be partitioned from the main airbag body of the curtain airbag 1. The partition plate 19 has a given height and width extending over the entire length of the edge and has a given thickness to provide sufficient rigidity. The partition plate 19 prevents the main airbag body from intruding into the central portion of the flange 13 having the opening 14, to eliminate the risk of improperly driving the tapping screw through the airbag. Further, the partition plate 19 can reduce an adverse effect to the flange 13 due to reaction caused by sudden expansion of the main airbag body during the activation of the curtain airbag. In order to cope with the strong reaction acting on the partition plate 19, the partition plate 19 is preferably supported by a pair of triangular support ribs 21 formed, respectively, at opposite edges of the flange 13 to enhance the rigidity of the partition plate.

The shank 11 has a length suitable for passing through both the airbag-anchor portion and the body panel. The shank hole 15 of the shank 11 may have any suitable length allowing the tapping screw to be driven thereinto. While the shank hole 15 in the illustrated embodiment penetrates the entire shank 11, it may terminate at the middle of the shank 11. The shank 11 may have any suitable cross-sectional shape, such as a circular shape, but it is preferably formed in a rectangular shape as illustrated, in order to readily position the partition plate 19 to face the main airbag body. The rectangular shank facilitates an operation of attaching the screw grommet to the airbag-anchor portion.

The shank hole 15 may have any suitable cross-sectional shape allowing the thread of the tapping screw to bite thereinto during driving of the tapping screw into the shank hole. In this embodiment, the shank hole 15 has a rectangular cross-section in its entirety in conformity to the rectangular cross-section of the shank. Further, the shank hole 15 is preferably formed with a pair of thread engagement ribs 22 (FIGS. 6 and 7) having a given thickness. Each of the thread engagement ribs 22 protrudes inward from the inner wall of the shank hole 15, and extends in the axial direction of the shank 11.

The shank 11 has opposite sides formed with a pair of resilient engagement fingers 23 which protrude outward therefrom in such a manner that they can be engaged with edge regions of the mounting holes to assure a temporary fixing state. After the tapping screw is driven or screwed fully into the shank hole 15, the resilient engagement fingers 23 are prevented from being bent inward, to assure a permanent fixing state.

Figure 5:
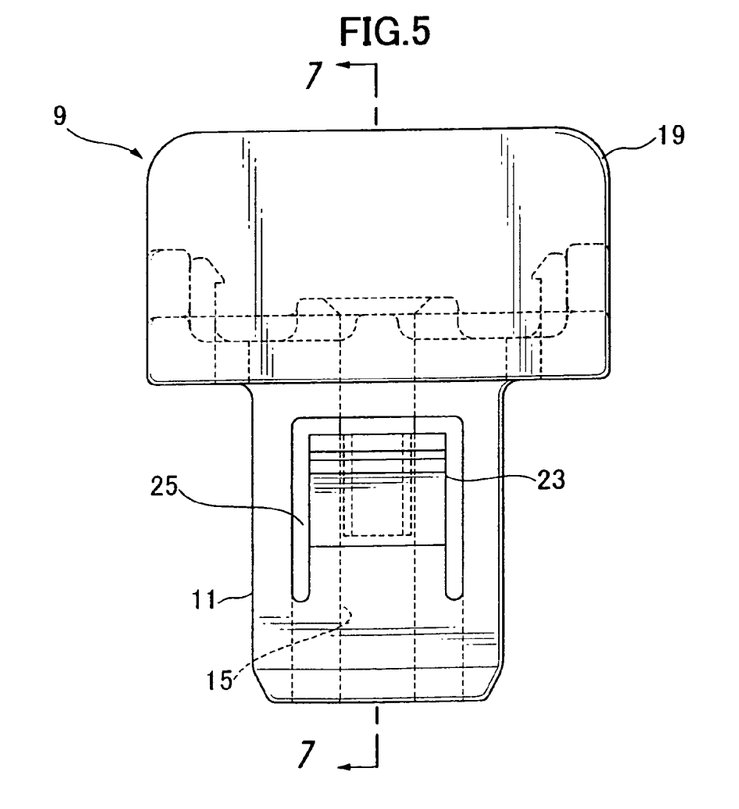
FIG. 5 is a right side view of the screw grommet in FIG. 3.

Each of the resilient engagement fingers 23 has a fixed end near an end of the shank 11 (lower end in FIG. 5) and a free end near the flange. As shown in FIG. 5, a reversed U-shaped slit 25 is formed around each resilient engagement finger 23 to separate a part of the resilient engagement finger from the main body of the shank 11 to provide flexibility to the resilient engagement finger 23 (particularly to the free end).

Figure 6:
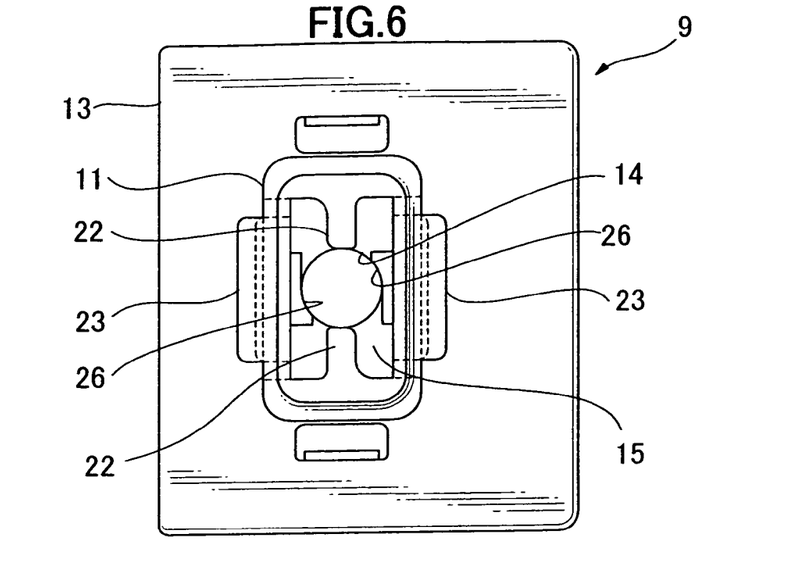
FIG. 6 is a bottom view of the screw grommet in FIG. 3.
Figure 7:
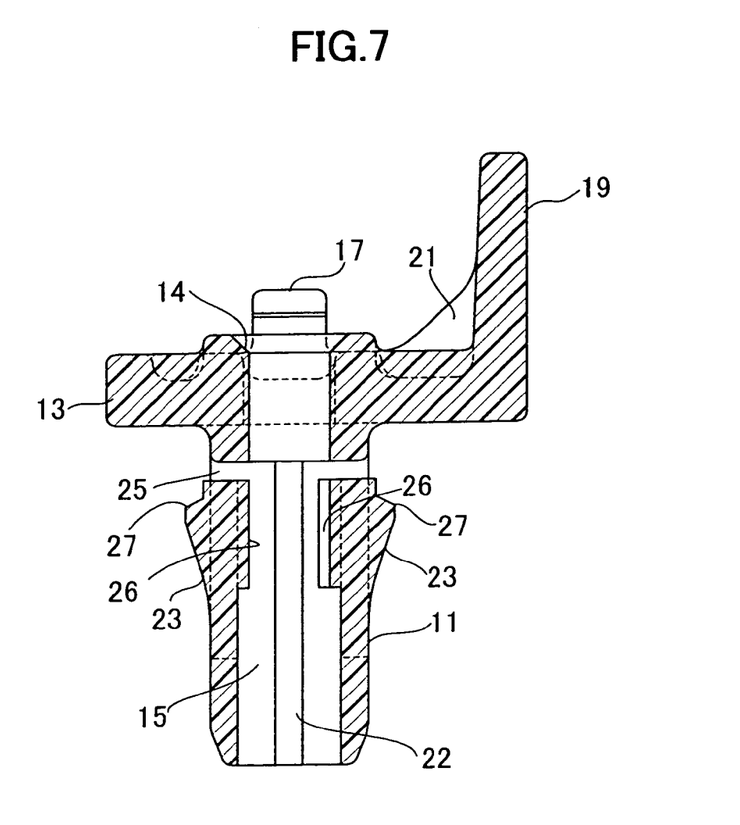
FIG. 7 is a sectional view of the screw grommet taken along the line 7—7 in FIG. 5.

As shown in FIGS. 6 and 7, each resilient engagement finger 23 has an inner surface 26 protruding into the shank hole 15 to engage the thread of the tapping screw which preferably bites into the inner surface. Surface 26 is preferably curved as shown in FIG. 6. Further, the resilient engagement finger 23 has an outer surface formed with an engagement shoulder 27 (FIGS. 7 and 10) adapted to be engaged with an edge region of the mounting hole of the body panel. The position of the engagement shoulders 27 is appropriately determined in conformity to the thickness of the airbag-anchor portion and the body panel. Preferably, an end of the resilient engagement finger 23 (upper end in FIG. 4) protrudes slightly outward from the outer surface of the shank 11 to form a second shoulder to be engaged with the support plate as described in detail later. The outer surface of the resilient engagement finger 23 has a shape gently sloping from the engagement shoulder 27 toward the end of the shank (lower end in FIG. 7) to prevent the resilient engagement finger 23 from impeding insertion of the shank 11 into the respective mounting holes of the airbag-anchor portion and the body panel.

Figure 9:
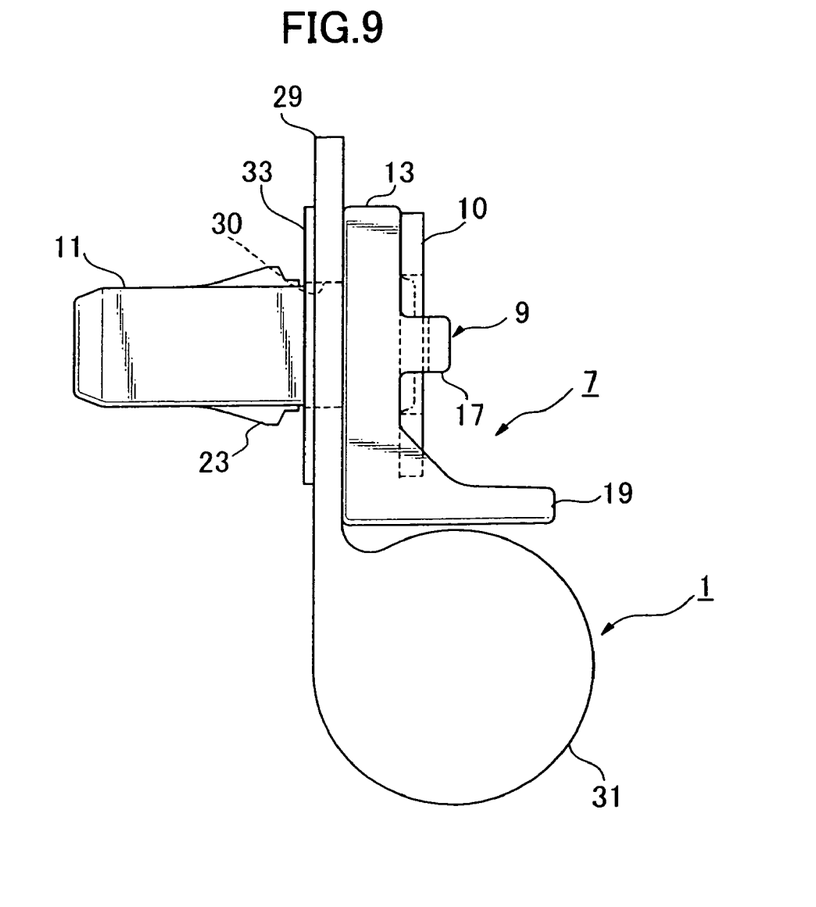
FIG. 9 is a view showing the fastener according to one embodiment of the present invention temporarily attached to a curtain airbag.

An operation of fixing the curtain airbag 1 to a body panel of an automobile using fasteners 7 constructed as above will be described with reference to FIGS. 9 to 11. The protective plate 10 is first arranged such that a tapping screw hole (not shown) of the protective plate is aligned with the opening 14 of the flange 13 of the screw grommet 9, and is then pushed onto the flange 13. Thus, the protective plate 10 is attached to the flange 13 by the lock pawls 17, and the fastener 7 in the above embodiment is assembled. The fastener 7 is carried to a position adjacent to the airbag-anchor portion 29 of the curtain airbag 1 (FIG. 9), and positioned such that the partition plate 19 faces to the main airbag body 31 of the curtain airbag 1. Then, the shank 11 is inserted into the mounting hole 30 of the airbag-anchor portion 29. After the insertion of the shank 11, the thin support plate 33 for clamping the airbag-anchor portion 29 in cooperation with the flange 13 is attached to the shank 11. The support plate 33 may be included as one of components of the fastener 7.

The support plate 33 has an appropriate thickness and is formed with a mounting hole for allowing the shank 11 to pass therethrough. The mounting hole has an edge region engageable with the top ends (second shoulders) of the resilient engagement fingers 23 to allow the airbag-anchor portion 29 to be clamped in surface contact with the flange 13 in the temporary fixing state, as shown in FIG. 9. The support plate 33 facilitates pre-attachment of a screw grommet 9 to each of the plurality of mounting holes formed in the curtain airbag 1 at given positions 6 (FIG. 1) so as to prepare the curtain airbag with the fasteners 7. After transporting the curtain airbag with the fasteners 7 to an automobile production line or the like, the curtain airbag can be temporarily fixed to a body panel merely by inserting the shanks of the screw grommets into the body panel.

Figure 10:
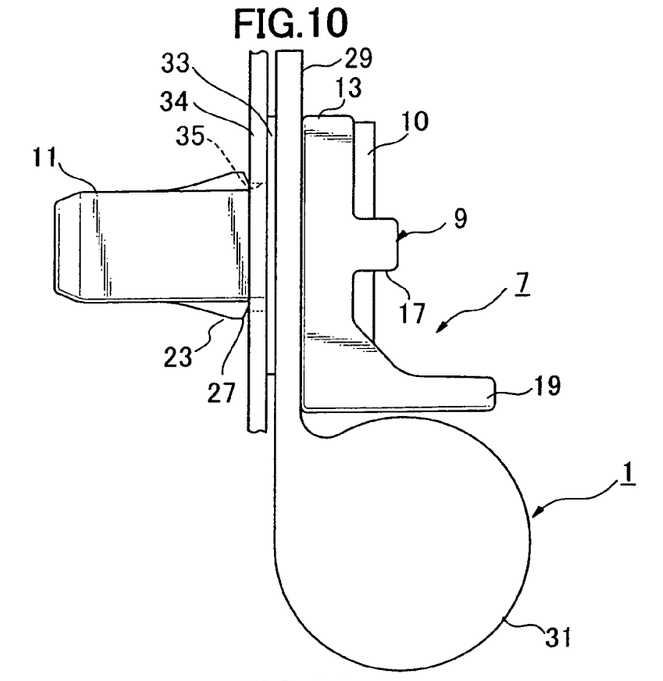
FIG. 10 is a view showing the curtain airbag with the fastener in FIG. 9 temporarily fixed to a body panel.

The body panel 34 shown in FIG. 10 is formed with a plurality of mounting holes 35 at predetermined positions 6 (FIG. 1). The curtain airbag 1 with the pre-attached screw grommets 9 is positioned to the body panel 34 such that each of the shanks 11 is aligned with a corresponding mounting hole 35. Then, each shank 11 can be simply inserted into a mounting hole 35 to bring the engagement shoulder 27 into engagement with the body panel 34. In this temporary fixing state, the curtain airbag 1 is fixed at given positions of the body panel 34 merely by inserting the respective shanks of the fasteners 7 into the corresponding mounting holes 35 formed at the fixing positions 6.

Figure 11:
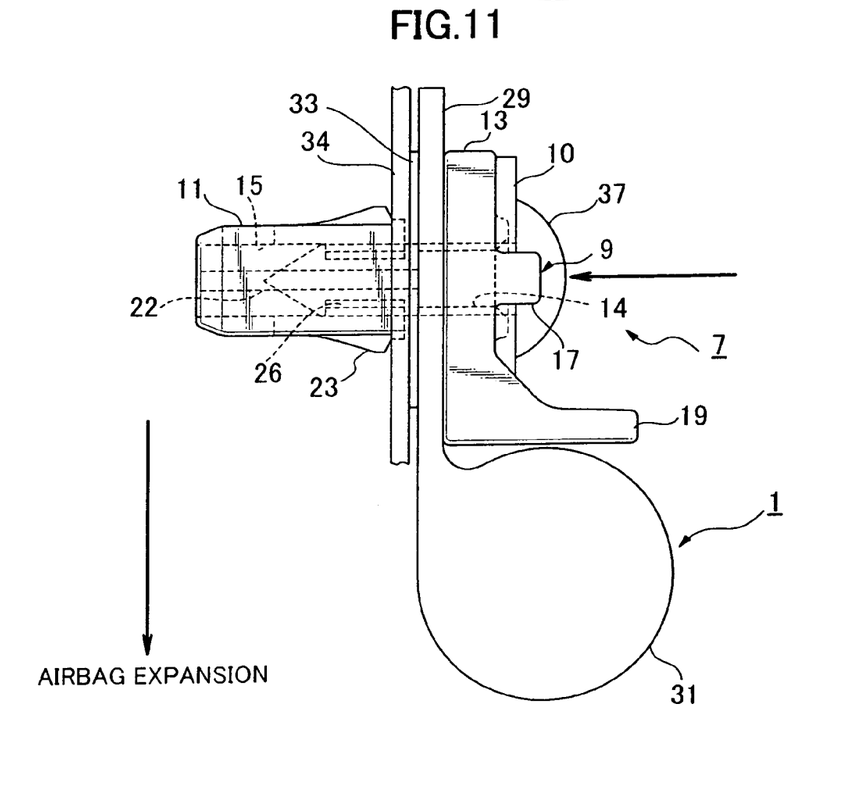
FIG. 11 is a view showing the curtain airbag of FIG. 10 permanently fixed to the body panel using a tapping screw.

As shown in FIG. 11, a tapping screw 37 is inserted into the tapping-screw hole of the protective plate 10 and the opening 14 and shank hole 15 of the screw grommet 9 in each of the fasteners, which are in the temporary fixing state, and then the tapping screw 37 is screwed or driven into them by using a tool such as a screwdriver. In this operation, the partition plate 19, integrally formed at an edge of the flange 13 to partition between the main airbag body 31 and the central region of the flange 13, can eliminate the risk of improperly driving the tapping screw into the main airbag body 31.

The tapping screw 37 is screwed or driven into the shank hole 15 while cutting thread in the thread engagement ribs 22 of the shank hole 15 and pr ferably also in the inner surfaces 26 of the resilient engagement fingers 23. With the tapping screw 37 located on the inner side of the resilient engagement fingers 23, the resilient engagement fingers 23 are prevented from being bent inward, thereby strongly engaging the engagement shoulders 27 with the body panel 34 to maintain the permanent fixing state. Thus, the curtain airbag 1 is fixed to the body panel by a high fastening force.

The partition plate 19 can reduce an adverse effect on the flange 13 due to reaction caused by sudden expansion of the activated airbag, and the protective plate 10 can provide enhanced strength of the flange 13 to enhance the fastening force to the panel. Thus, the fixing of the curtain airbag can be reliably maintained even in occurrence of reaction caused by sudden expansion of the activated airbag.

While a preferred embodiment of the invention has been shown and described, it will be apparent that changes can be made without departing from the principles and spirit of the invention, the scope of which is defined in the accompanying claims. For example, in the absence of the support plate 33, the length of the resilient engagement fingers 23 would be increased to clamp the airbag-anchor portion to the flange 13, and the anchor portion would be pressed directly against the panel 34.

What is claimed is:

1. A fastener for fixing an airbag-anchor portion of a curtain airbag to a body panel of a vehicle, comprising a screw grommet having a shank adapted to be inserted into respective mounting holes of both the airbag-anchor portion and the body panel and having a flange adapted to press the airbag-anchor portion against the body panel, and a tapping screw, wherein the flange has an opening and the shank has a shank hole continuous to the opening which allow the tapping screw to be driven thereinto, wherein the shank has resilient engagement fingers protruding outward from sides of the shank to engage with edge regions of the mounting hole of the body panel in a temporary fixing state, the resilient engagement fingers being supported on the sides of the shank for movement into the shank hole, having surfaces disposed to engage the tapping screw in the shank hole, and being held in a permanent fixing state by screwing the tapping screw into the shank hole, to prevent the fingers from being moved inward of the shank, and wherein the flange has an outer peripheral edge integrally formed with a partition plate which stands upright therefrom and fixed thereto to partition a flange region having the opening from a main body of the curtain airbag, further including a protective plate detachably attached onto and over the flange of the screw grommet by a pair of lock pawls to protect the flange and enhance the pressing force of a head of the tapping screw against the flange, the lock pawls extending from the flange in a direction opposite to the direction of the shank, being spaced apart to embrace the protective plate between the pawls, being constructed to overlie the protective plate between the pawls, and being constructed with tapers facing one another and oriented to permit the protective plate to be pressed past the pawls into engagement with the flange, whereupon the pawls attach the protective plate to the flange, wherein the protective plate has an opening aligned with the flange opening, and wherein the partition plate extends upright from the flange edge substantially beyond the protective plate and the opening in the protective plate.

2. The fastener as defined in claim 1, further including a support plate for clamping the airbag-anchor portion in cooperation with the flange, the support plate being formed with a mounting hole with the shank passing therethrough, the mounting hole having an edge region engaged with shoulders of the resilient engagement fingers to mount the support plate on the shank independently of the tapping screw and to maintain the airbag-anchor portion clamped between the support plate and the flange.

3. The fastener as defined in claim 1, wherein the resilient engagement fingers include one pair of the fingers formed on opposite sides of the shank, each having a hinged end near an end of the shank and being partially surrounded by a slot extending through a wall of a shank to provide a free end toward the flange, each finger extending through the wall of the shank, via the slot, and projecting beyond the wall into the shank hole to provide the inner surface that engages the tapping screw.

* * * * *